United States Patent
Jung et al.

(10) Patent No.: US 9,900,516 B2
(45) Date of Patent: Feb. 20, 2018

(54) METHOD AND ELECTRONIC DEVICE FOR GENERATING THUMBNAIL IMAGE

(71) Applicant: Samsung Electronics Co., Ltd., Suwon-si, Gyeonggi-do (KR)

(72) Inventors: Jee-Hye Jung, Seoul (KR); Bo-Kun Choi, Seoul (KR); Sae-Mee Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 14/263,243

(22) Filed: Apr. 28, 2014

(65) Prior Publication Data

US 2014/0327806 A1    Nov. 6, 2014

(30) Foreign Application Priority Data

May 2, 2013   (KR) .......................... 10-2013-0049425

(51) Int. Cl.
*H04N 5/232* (2006.01)
*H04N 1/387* (2006.01)

(52) U.S. Cl.
CPC ....... *H04N 5/23293* (2013.01); *H04N 1/3875* (2013.01)

(58) Field of Classification Search
CPC .. H04N 5/23293; H04N 5/772; H04N 1/3875; H04N 1/2112; H04N 5/23219
See application file for complete search history.

(56) References Cited

U.S. PATENT DOCUMENTS

| | | | | |
|---|---|---|---|---|
| 7,675,563 B2 * | 3/2010 | Nakajima | .......... | H04N 1/32101 348/333.05 |
| 7,694,213 B2 * | 4/2010 | Kuwabara | ............ | G11B 27/034 715/201 |
| 7,835,550 B2 * | 11/2010 | Tamaru | ............... | G06F 17/3028 382/118 |
| 2002/0135688 A1 * | 9/2002 | Niikawa | ................ | H04N 5/217 348/251 |
| 2003/0147563 A1 * | 8/2003 | Liu | ..................... | H04N 1/32128 382/276 |
| 2004/0196502 A1 * | 10/2004 | Mikawa | ............. | H04N 1/00132 358/1.15 |
| 2005/0220349 A1 * | 10/2005 | Furuya | ............... | H04N 5/23293 382/195 |
| 2006/0227384 A1 | 10/2006 | Kawada | | |
| 2009/0208118 A1 | 8/2009 | Csurka | | |
| 2009/0268076 A1 | 10/2009 | Kawamura et al. | | |
| 2010/0214321 A1 | 8/2010 | Hokkanen et al. | | |
| 2012/0151398 A1 * | 6/2012 | Foy | .................. | G06F 17/30268 715/769 |

(Continued)

FOREIGN PATENT DOCUMENTS

| | | |
|---|---|---|
| JP | 2000-295570 A | 10/2000 |
| JP | 2006-270578 A | 10/2006 |

(Continued)

*Primary Examiner* — Luong T Nguyen
(74) *Attorney, Agent, or Firm* — Jefferson IP Law, LLP

(57) ABSTRACT

A device and a method for generating a thumbnail image in an electronic device are provided. The method includes displaying an image, setting coordinates for at least one object in the image, and generating some areas of the at least one object as a thumbnail image according to the coordinates.

24 Claims, 13 Drawing Sheets

(56) References Cited

U.S. PATENT DOCUMENTS

| | | | | |
|---|---|---|---|---|
| 2013/0070142 A1* | 3/2013 | Okazawa | ............ | H04N 5/23212 |
| | | | | 348/333.01 |
| 2014/0071323 A1* | 3/2014 | Yi | ................. | G06F 3/04883 |
| | | | | 348/333.01 |
| 2014/0143858 A1* | 5/2014 | Brixel | .................. | G06F 21/36 |
| | | | | 726/19 |
| 2014/0321770 A1* | 10/2014 | Potdar | .................. | G06T 11/60 |
| | | | | 382/282 |

FOREIGN PATENT DOCUMENTS

| | | |
|---|---|---|
| JP | 2011-055291 A | 3/2011 |
| KR | 10-2007-0034931 A | 3/2007 |
| KR | 10-0811796 A | 3/2008 |

\* cited by examiner

METHOD AND ELECTRONIC DEVICE FOR GENERATING THUMBNAIL IMAGE

CROSS-REFERENCE TO RELATED APPLICATION(S)

This application claims the benefit under 35 U.S.C. § 119(a) of a Korean patent application filed on May 2, 2013 in the Korean Intellectual Property Office and assigned Serial number 10-2013-0049425, the entire disclosure of which is hereby incorporated by reference.

TECHNICAL FIELD

The present disclosure relates to a method and a device for generating thumbnail images in an electronic device. More particularly, the present disclosure relates to a method for generating a thumbnail image for an original image in an electronic device.

BACKGROUND

Electronic devices have become a necessity due to high portability and have developed into multimedia devices that provide various services, such as voice and video call functions, information input and output functions, a camera function, data transmission and reception, and the like.

FIGS. 1A, 1B, 1C, and 1D illustrate screen configurations of generating a thumbnail image in an electronic device according to the related art.

Referring to FIGS. 1A, 1B, 1C, and 1D, if the electronic device captures and stores an image through a camera, it generates a thumbnail image to enable a user to view the captured image. For example, as shown in FIG. 1A, if a "gallery" 105 program is executed in order to provide images stored in the electronic device, the electronic device displays an original image 103 on a display device 101 to be suitable for the size 107 of a thumbnail image of the gallery 105 program.

However, a user of the electronic device often finds it difficult to view images through thumbnail images. Here, errors in generating thumbnail images are described by using examples. For example, as shown in FIG. 1B, a thumbnail image 115 generated by reducing and cropping the original image 103 to be suitable for the size 113 of a thumbnail image may not be suitable as a thumbnail image for viewing the original image 103. As another example, as shown in FIG. 1C, a thumbnail image 123 generated by using focus information 121 included in the original information may not be suitable as a thumbnail image for viewing the original image 103. As another example, as shown in FIG. 1D, a thumbnail image 131 generated by adjusting the original image 103 to be suitable for the size 113 of a thumbnail image without considering the portion of the original image may not be suitable as a thumbnail image for viewing the original image 103.

When generating a thumbnail image for an image in an electronic device as described above, viewing an original image is not easy in some cases. Thus, there is a need for an improved method of generating a thumbnail image for an original image in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device for generating a thumbnail image in an electronic device.

Another aspect of the present disclosure is to provide a method and a device for generating some areas of at least one object as a thumbnail image according to the coordinates of an object included in an image in an electronic device.

Another aspect of the present disclosure is to provide a method and a device for generating some areas of person information as a thumbnail image according to the coordinates of person information included in an image in an electronic device.

Another aspect of the present disclosure is to provide a method and a device for generating some areas of place information as a thumbnail image according to the coordinates of place information included in an image in an electronic device.

Another aspect of the present disclosure is to provide a method and a device for including the coordinates of an object in metadata of image data in an electronic device, the object having been included in an image.

Another aspect of the present disclosure is to provide a method and a device for including the coordinates of person information in metadata of image data in an electronic device, the person information having been included in an image.

Another aspect of the present disclosure is to provide a method and a device for including the coordinates of place information in metadata of image data in an electronic device, the place information having been included in an image.

In accordance with an aspect of the present disclosure, a method for generating a thumbnail image in an electronic device is provided. The method includes displaying an image, setting coordinates for at least one object in the image, and generating some areas of the at least one object as a thumbnail image according to the coordinates.

In accordance with another aspect of the present disclosure, an electronic device is provided. The electronic device includes at least one processor, at least one memory, and at least one program stored in the memory, wherein the at least one program is configured to be executable by the at least one processor, and wherein the at least one processor is configured to display an image, set coordinates for at least one object in the image, and generate some areas of the at least one object as a thumbnail image of the image according to the coordinates.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures

DETAILED DESCRIPTION

Figure 1A:
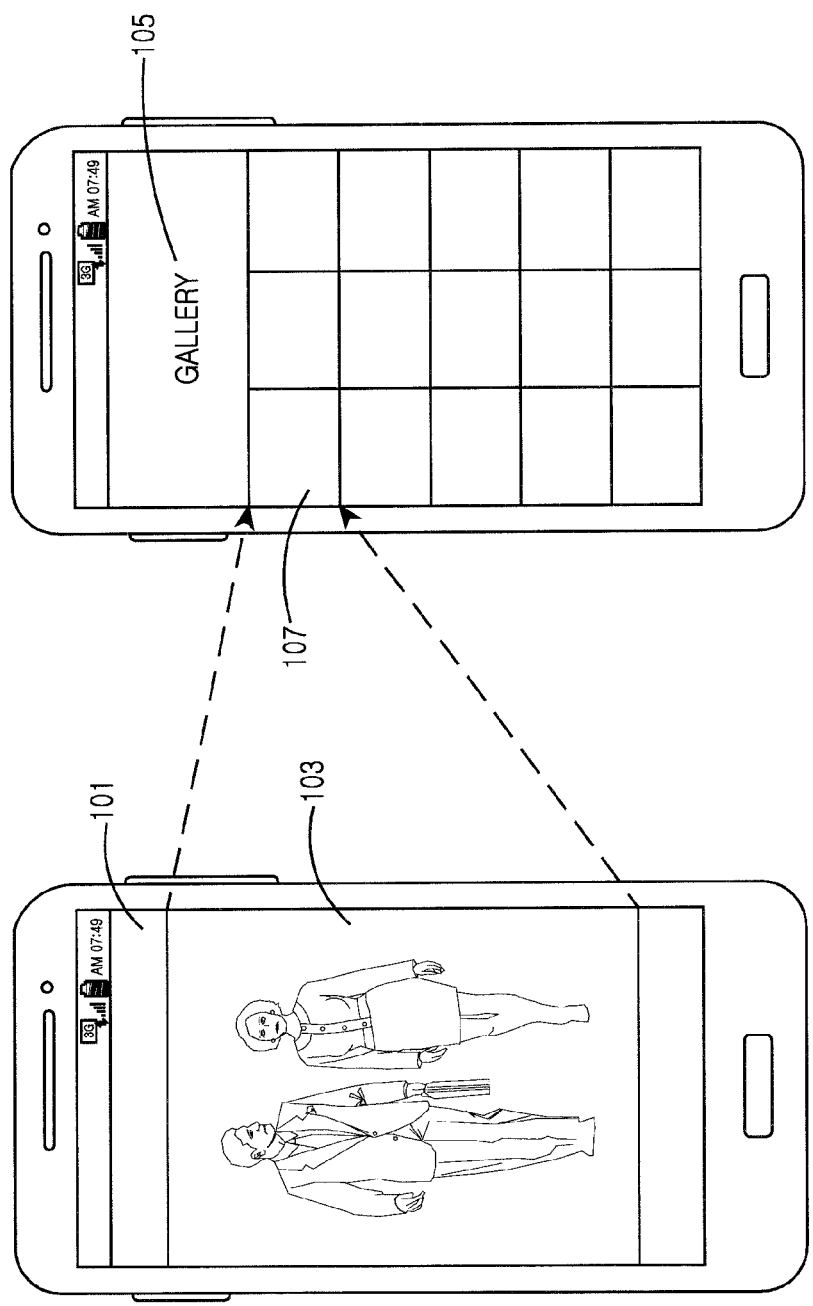
FIGS. 1A, 1B, 1C, and 1D illustrate screen configurations of generating a thumbnail image in an electronic device according to the related art.
Figure 1B:
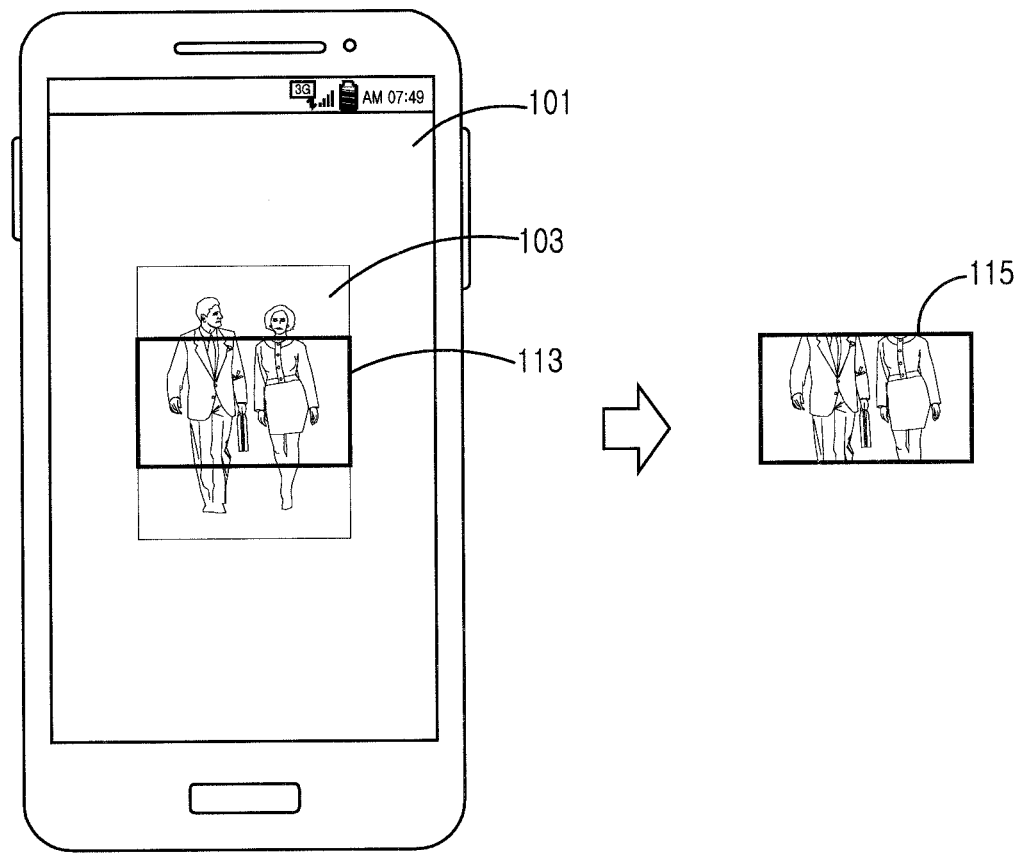
Figure 1C:
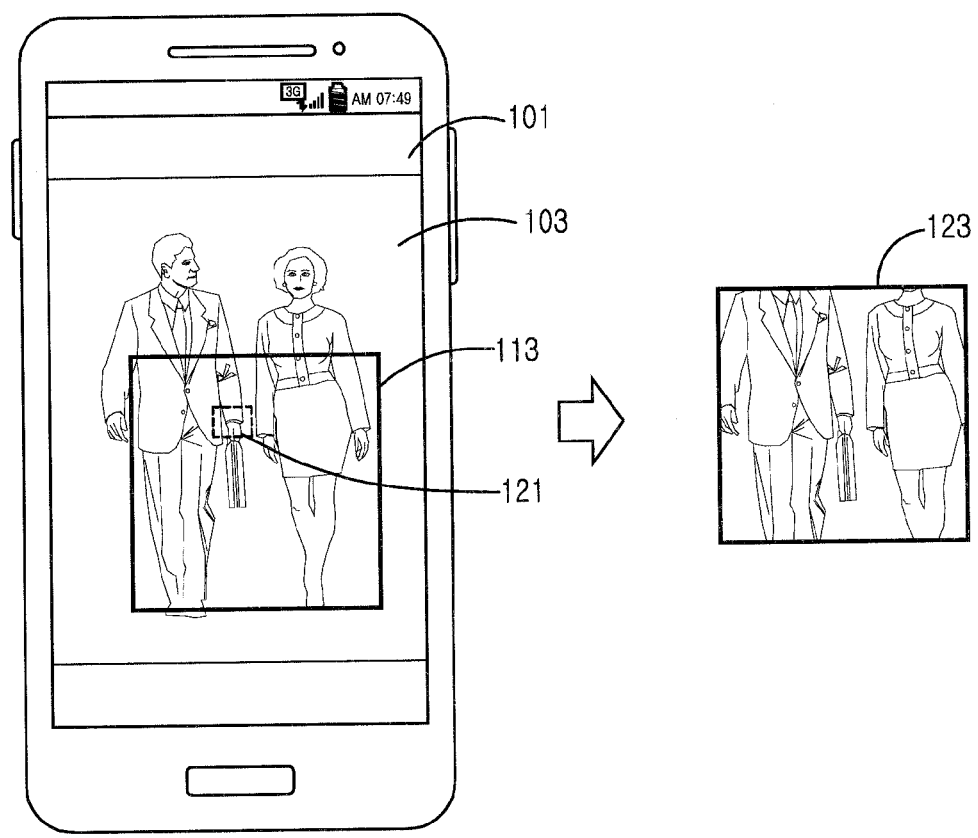
Figure 1D:
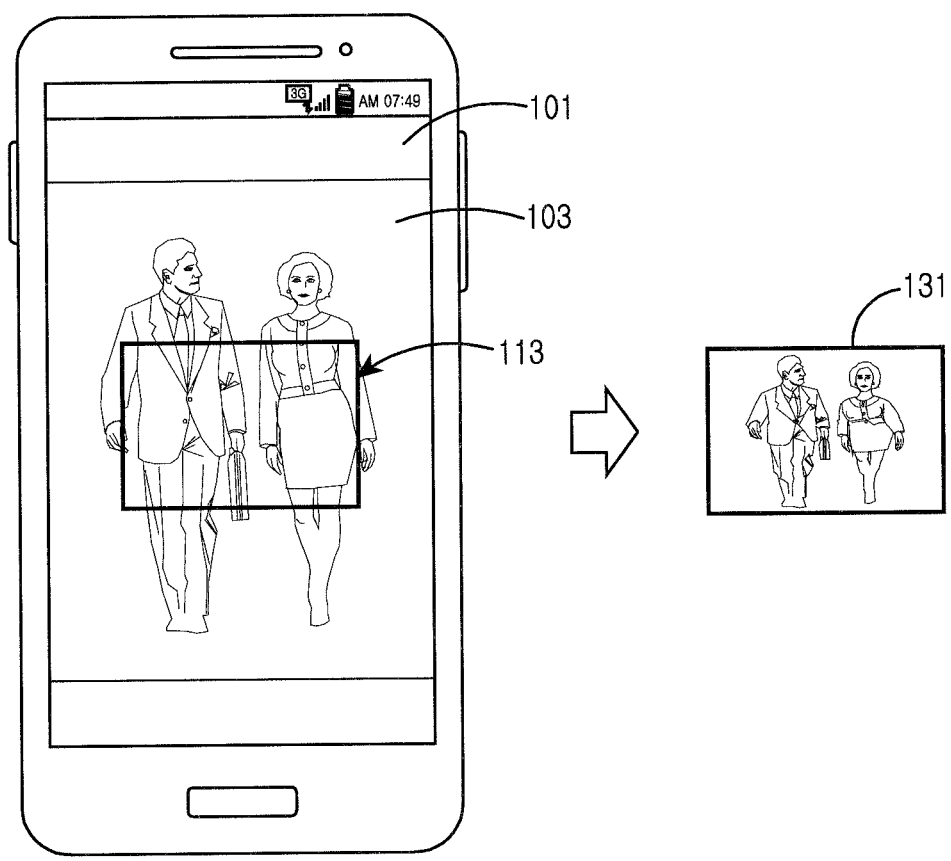

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present disclosure relates to a method for setting coordinates for an object in an electronic device and generating some areas of the object as thumbnail images according to the set coordinates.

In addition, the present disclosure relates to a method for generating some areas of an object as a thumbnail image according to the coordinates of an object included in an image in an electronic device.

Here, the object may include at least one of person information and place information that may exist on a screen at a time when the electronic device captures an image. In this case, the person information may utilize a focus area of a camera and the place information may utilize location information by the camera, 3 Dimensional (3D) map information, sensor information, and the like.

With respect to person information, most current commercial cameras use focus information on a face, but in a case of an expanded recognition engine, it is possible to extract person information including at least one of upper and whole bodies of a person and it is also possible to extract specific pose information. In a case of using the focus information on the face, there is a method for extracting the coordinates of a face through actual image processing and utilizing the extracted coordinates as person information.

With respect to place information, it is possible to extract place information on a screen extracted from an angle of view of a camera, sensor information representing a bearing, and information associated with 2 Dimensional (2D) and 3D maps. The place information is detected along with a relative location on a screen. Geotagging information that may be extracted when taking a picture is currently utilized but if the place information is later expanded to be made as a database, it is also possible to further give the place information to the picture that has been already taken.

The electronic device may include a mobile communication terminal, a Personal Digital Assistant (PDA), a laptop, a smart phone, a netbook, a TV, a Mobile Internet Device (MID), an Ultra Mobile PC (UMPC), a tablet Personal Computer (PC), a navigation device, a digital watch, a refrigerator, a Motion Pictures Expert Group (MPEG-1 or MPEG-2) Audio Layer 3 (MP3) player, and the like, in the following description.

Figure 2:
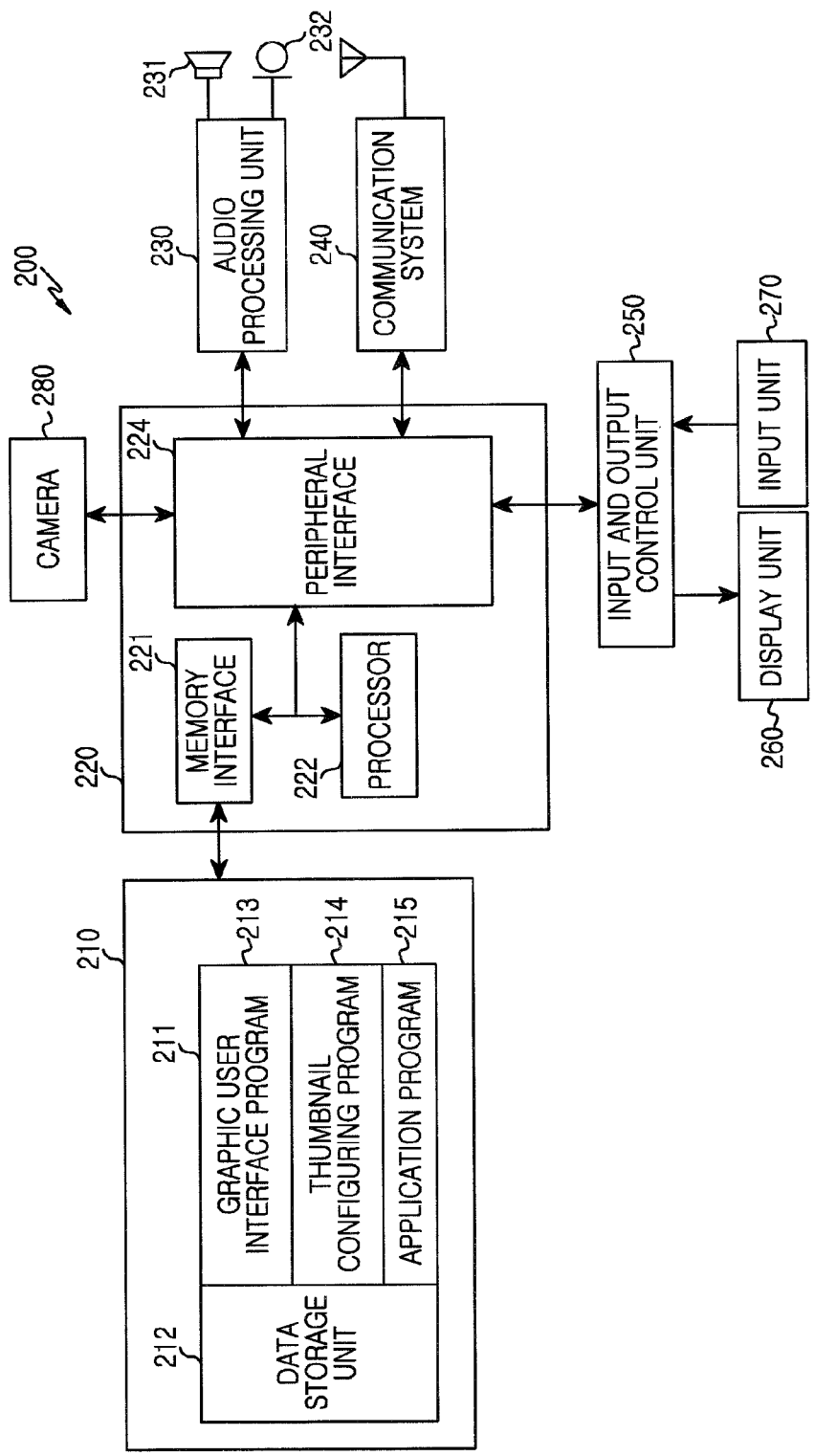
FIG. 2 is a block diagram of an electronic device according to an embodiment of the present disclosure.

FIG. 2 is a block diagram of an electronic device according to an embodiment of the present disclosure.

Referring to FIG. 2, an electronic device 200 may include a memory 210, a processor unit 220, an audio processing unit 230, a communication system 240, an input and output control unit 250, a display unit 260, an input unit 270, and a camera 280. Here, there may be more than one of each component of the electronic device 200. Each component will be described below.

The memory 210 may include a program storage unit 211 for storing programs that control the operation of the electronic device 200 and a data storage unit 212 for storing data generated during the execution of the programs. For example, the memory 210 may also store raw data on a subject obtained through the camera 280. As another example, the memory 210 may also store a thumbnail image generated through a thumbnail configuring program 214. As another example, the memory 210 may also store image data including thumbnail image data through the thumbnail configuring program 214.

The program storage unit 211 may include a Graphic User Interface (GUI) program 213, the thumbnail configuring program 214, and at least one application program 215. Here, programs in the program storage unit 211 are a set of instructions, so they may be represented as an instruction set.

The GUI program 213 may include at least one software component for providing a graphic user interface to the display unit 260. For example, the GUI program 213 allows an image obtained through the camera 280 by the thumbnail configuring program 214 to be displayed on the display unit 260. As another example, the GUI program 213 may also allow a thumbnail image generated by the thumbnail configuring program 214 to be displayed on the display unit 260.

The thumbnail configuring program 214 may include at least one software component for generating some areas of an object as a thumbnail image according to the coordinates of an object in an image. For example, when an image includes person information that includes at least one of the face, upper and whole bodies of a person based on facial recognition, the thumbnail configuring program 214 generates some areas of person information as a thumbnail image according to the coordinates of the person information in the image. As another example, when the image includes place information (i.e., statues, buildings, remains, and the like) detected by using an angle of view of a camera, a bearing, location information, (2D and 3D) map information, and the like, the thumbnail configuring program 214 may also generate some areas of the place information as a thumbnail image according to the coordinates of the place information in the image.

Further, after generating a thumbnail image, the thumbnail configuring program 214 may allow image data including thumbnail image data to be stored. For example, the thumbnail configuring program 214 may allow at least one of a coordinate including person information in an image and a coordinate including place information in an image and thumbnail image data to be stored by using at least one of an Exchangeable Image File Format (EXIF), an Extensible Metadata Platform from Adobe (XMP), International Press Telecommunications Council (IPTC), and the like.

The application program 215 may include a software component for at least one application program that is installed in the electronic device 200.

The processor unit 220 may include a memory interface 221, at least one processor 222, and a peripheral interface 224. Here, the memory interface 221, the at least one processor 222, and the peripheral interface 224 in the processor unit 220 may be integrated as at least one Integrated Circuit (IC) or may be implemented as separate components.

The memory interface 221 controls an access of components, such as the at least one processor 222 or the peripheral interface 224, to the memory 210.

The peripheral interface 224 controls the connection among an input and output peripheral device, the at least one processor 222, and the memory interface 221 of the electronic device 200.

Figure 3:
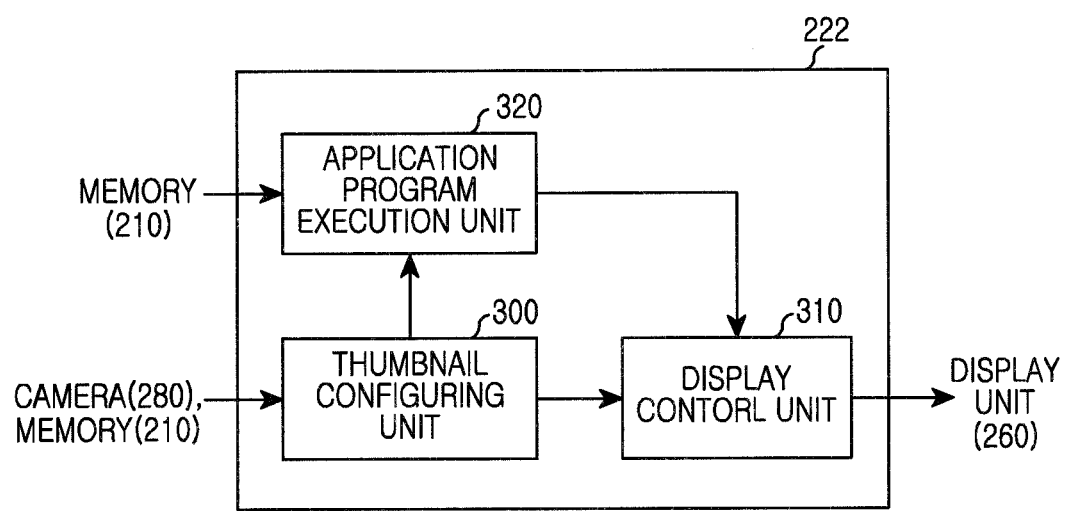
FIG. 3 is a block diagram of a processor according to an embodiment of the present disclosure.

The at least one processor 222 allows the electronic device 200 to provide various services by using at least one software program. In this case, the at least one processor 222 executes at least one program stored in the memory 210 and allows a service to be provided according to a corresponding program. The at least one processor 222 may be configured to execute the thumbnail configuring program 214 and control the generation of a thumbnail image, as shown in FIG. 3.

The audio processing unit 230 provides an audio interface between a user and the electronic device 200 through a speaker 231 and a microphone 232.

The communication system 240 may include at least one software component for performing a communication function for voice communication and data communication. In this case, the communication system 240 may also be divided into several communication sub modules that support different communication networks. For example, the communication network may include a Global System for Mobile Communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a wireless Local Area Network (LAN), a Bluetooth network, Near Field Communication (NFC), and the like.

The input and output control unit 250 provides an interface between the peripheral interface 224 and an input and output peripheral device including the display unit 260 and the input unit 270.

The display unit 260 displays state information on the electronic device 200, texts input by a user, moving pictures and still pictures, and the like. For example, the display unit 260 displays application program information that is executed by the at least one processor 222. As another example, the display unit 260 may display an image obtained through the camera 280 according to the control of the GUI program 213. Moreover, the display unit 260 may also display a thumbnail image generated by the thumbnail configuring program 214 according to the control of the GUI program 213.

The input unit 270 provides input data generated by user selection to the processor unit 220 through the input and output control unit 250. In this case, the input unit 270 may include a keypad that includes at least one hardware buttons, and a touch pad that detects touch information. For example, the input unit 270 provides touch information detected through the touch pad to the at least one processor 222 through the input and output control unit 250.

The camera 280 obtains subject information through an image sensor. In this case, an image processing processor in the camera 280 may also temporarily store the obtained subject information as RGB/YUV data with a protocol format for raw data in the memory 210.

FIG. 3 is a block diagram of a processor according to an embodiment of the present disclosure.

Referring to FIG. 3, the at least one processor 222 may include a thumbnail configuring unit 300, a display control unit 310, and an application program execution unit 320.

The thumbnail configuring unit 300 executes the thumbnail configuring program 214 of the program storage unit 211 and allows some areas of an object to be generated as a thumbnail image according to the coordinates of an object in an image. For example, when an image includes person information that includes at least one of the face, upper and whole bodies of a person based on facial recognition, the thumbnail configuring unit 300 allows some areas of person information to be generated as a thumbnail image according to the coordinates of the person information in the image. As another example, when the image includes place information (i.e., statues, buildings, remains, and the like) detected by using an angle of view of a camera, a bearing, location information, (2D and 3D) map information, and the like, the thumbnail configuring unit 300 may also allow some areas of the place information to be generated as a thumbnail image according to the coordinates of the place information in the image.

Further, after generating a thumbnail image, the thumbnail configuring unit 300 may allow image data including thumbnail image data to be stored. For example, the thumbnail configuring unit 300 may allow at least one of a coordinate including person information in an image and a coordinate including place information in an image and thumbnail image data to be stored by using at least one of EXIF, XMP, IPTC, and the like.

The display control unit 310 executes the graphic user interface program 213 of the program storage unit 211 and provides a graphic user interface to the display unit 260. For example, the display control unit 310 allows an image obtained through the camera 280 by the thumbnail configuring unit 300 to be displayed on the display unit 260. As another example, the display control unit 310 may also allow a thumbnail image generated by the thumbnail configuring unit 300 to be displayed on the display unit 260.

In the above-described embodiment, the thumbnail configuring unit 300 of the electronic device executes the thumbnail configuring program 214 and allows some areas of an object to be generated as a thumbnail image according to the coordinates of an object in an image.

In another embodiment, the electronic device may also include a separate thumbnail configuring module that includes the thumbnail configuring program 214.

Figure 4A:
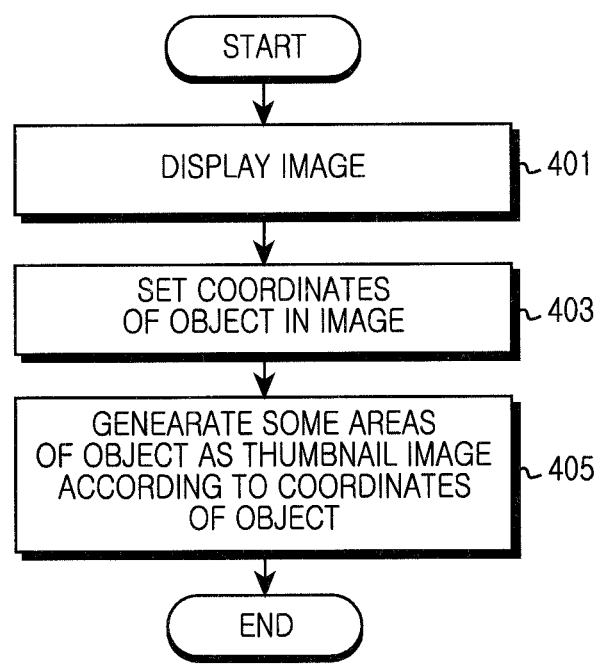
FIG. 4A is a flowchart of a procedure of generating some areas of an object as a thumbnail image according to coordinates of an object included in an image in an electronic device according to an embodiment of the present disclosure.

FIG. 4A is a flowchart of a procedure of generating some areas of an object as a thumbnail image according to coordinates of an object included in an image in an electronic device according to an embodiment of the present disclosure.

Referring to FIG. 4A, the electronic device displays an image in operation 401. For example, if the front or rear camera of the electronic device is driven, the electronic device displays an image obtained through the camera as a preview on a display unit. In this case, the electronic device may display the image obtained through the camera as a preview through refresh operations. Here, the image displayed as the preview may be an image that is obtained through the camera of the electronic device and temporarily stored in a buffer memory.

Subsequently, the electronic device sets coordinates of at least one object in the image in a certain fashion in operation 403. For example, the electronic device sets coordinates for person information including at least one of the face, upper and whole bodies of a person based on facial recognition. As another example, the electronic device may also set coordinates for place information (i.e., statues, buildings, remains, and the like) detected by using an angle of view of the camera, a bearing, location information, (2D and 3D) map information, and the like.

Subsequently, the electronic device generates some areas of an object as a thumbnail image according to the coordinates of an object in operation 405. For example, if a face is recognized from an image, the electronic device generates some areas of the image including the face in the image as a thumbnail image. As another example, if place information is detected from the image, the electronic device may also generate some areas of the image including place information in the image as a thumbnail image.

Further, after generating the thumbnail image, the electronic device may also store image data including thumbnail image data. For example, the electronic device may also store thumbnail image data and at least one of a coordinate for person information in an image and a coordinate for place information in an image by using at least one of EXIF, XMP, IPTC, and the like. Subsequently, the electronic device terminates this algorithm.

Figure 4B:
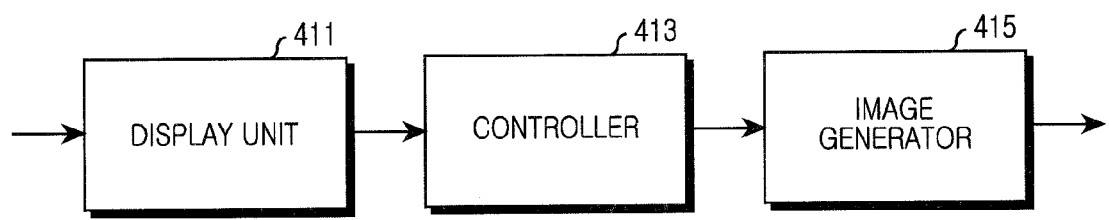
FIG. 4B is a block diagram of an electronic device for generating some areas of an object as a thumbnail image according to coordinates of an object included in an image in an electronic device according to an embodiment of the present disclosure.

As described above, each procedure for allowing the electronic device to generate some areas of an object as a thumbnail image according to the coordinates of an object in an image may be configured to allow some areas of an object to be generated as a thumbnail image according to an object in an image as shown in FIG. 4B.

FIG. 4B is a block diagram of an electronic device for generating some areas of an object as a thumbnail image according to coordinates of an object included in an image according to an embodiment of the present disclosure.

Referring to FIG. 4B, the electronic device may include a display unit 411 for obtaining and displaying an image, a controller 413 for setting coordinates for an object in an image, and an image generator 415 for generating a thumbnail image.

The display unit 411 displays an image. For example, if the front or rear camera of the electronic device is driven, the electronic device displays an image obtained through the camera as a preview on a display unit. In this case, the electronic device may display the image obtained through the camera as a preview through refresh operations. Here, the image displayed as the preview may be an image that is obtained through the camera of the electronic device and temporarily stored in a buffer memory.

The controller 413 sets coordinates of at least one object in the image in a certain fashion. For example, the electronic device sets coordinates for person information including at least one of the face, upper and whole bodies of a person based on facial recognition. As another example, the electronic device may also set coordinates for place information (i.e., statues, buildings, remains, and the like) detected by using an angle of view of the camera, a bearing, location information, (2D and 3D) map information, and the like.

The image generator 415 generates some areas of an object as a thumbnail image according to the coordinates of an object in operation 405. For example, if a face is recognized from an image, the electronic device generates some areas of the image including the face in the image as a thumbnail image. As another example, if place information is detected from the image, the electronic device may also generate some areas of the image including place information in the image as a thumbnail image.

Further, after generating the thumbnail image, the electronic device may further include a storage unit configured to store image data including thumbnail image data. For example, the storage unit of the electronic device may further be configured to store thumbnail image data and at least one of a coordinate for person information in an image and a coordinate for place information in an image by using at least one of EXIF, XMP, IPTC, and the like.

As described above, the controller 413 of the electronic device may allow some areas of an object to be generated as a thumbnail image according to the coordinates of an object in an image. In this case, the electronic device may be configured to allow some areas of an object to be generated as a thumbnail image according to the coordinates of an object in an image.

Figure 5:
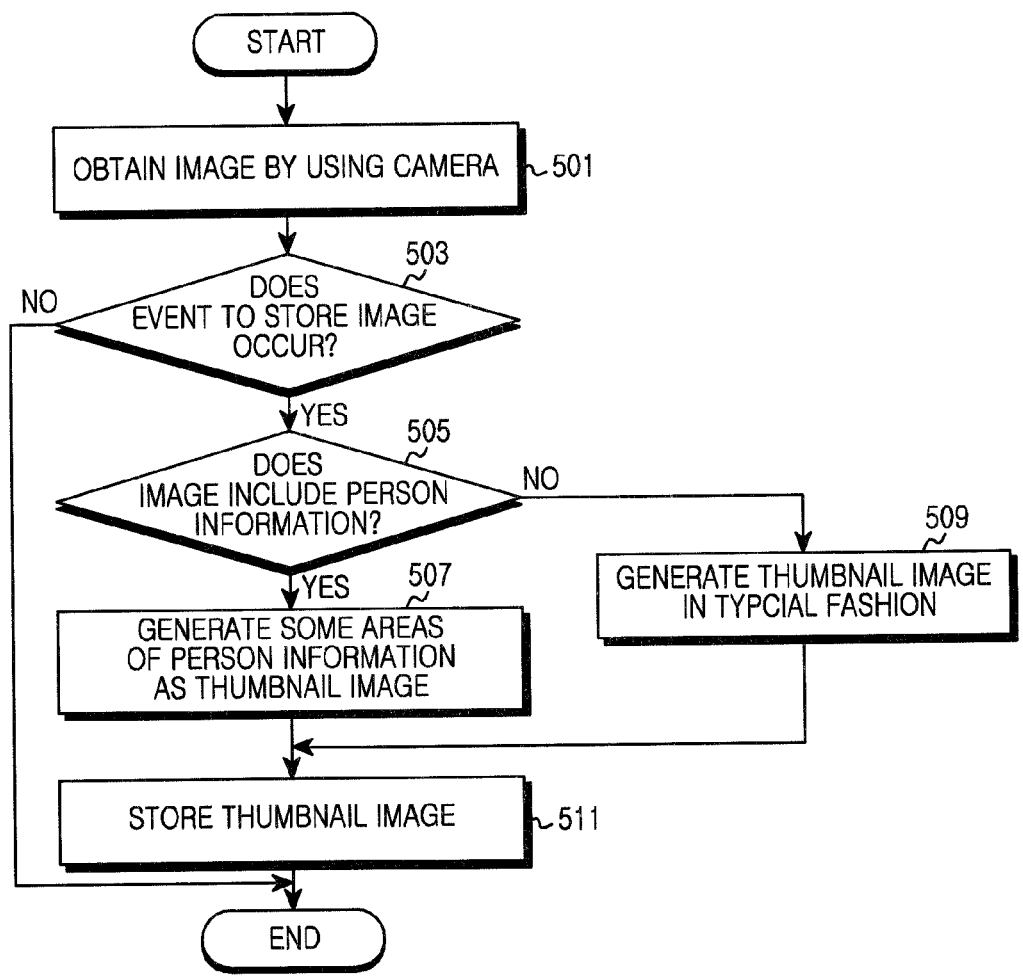
FIG. 5 is a flowchart of a procedure of generating some areas of person information as a thumbnail image according to coordinates of person information included in an image in an electronic device according to an embodiment of the present disclosure.

FIG. 5 is a flowchart of a procedure of generating some areas of person information as a thumbnail image according to coordinates of person information included in an image in an electronic device according to an embodiment of the present disclosure.

Referring to FIG. 5, the electronic device obtains an image by using the camera in operation 501. For example, if the front or rear camera of the electronic device is driven, the electronic device displays an image obtained through the camera as a preview on a display unit. In this case, the electronic device may display the image obtained through the camera as a preview through refresh operations. Here, the image displayed as the preview may be an image that is obtained through the camera of the electronic device and temporarily stored in a buffer memory.

After obtaining an image by using the camera, the electronic device determines whether an event to store an image occurs, in operation 503. For example, the electronic device determines by menu or button manipulation whether an event to store an image displayed as a preview occurs. As another example, the electronic device may also determine by a timer whether an event to store an image displayed as a preview occurs. If it is determined in operation 503 that the event to store the image does not occur, the electronic device terminates this algorithm. Moreover, if the event to store the image does not occur, the electronic device may also maintain the operation of displaying the image obtained through the camera as a preview.

On the other hand, if it is determined in operation 503 that the event to store the image occurs, the electronic device determines whether the image includes person information, in operation 505. Here, the person information may include at least one of the face, upper and whole bodies of a person detected based on facial recognition.

If it is determined in operation 505 that the image does not include person information, the electronic device generates a thumbnail image in a typical fashion in operation 509. For example, the electronic device reduces the size of an image to generate a thumbnail image. As another example, the electronic device may crop the image based on focus information represented on the image to generate a thumbnail image.

On the other hand, if it is determined in operation 505 that the image includes person information, the electronic device generates some areas of person information as a thumbnail image according to the coordinates of person information, in operation 507.

Figures 6A, 6B:
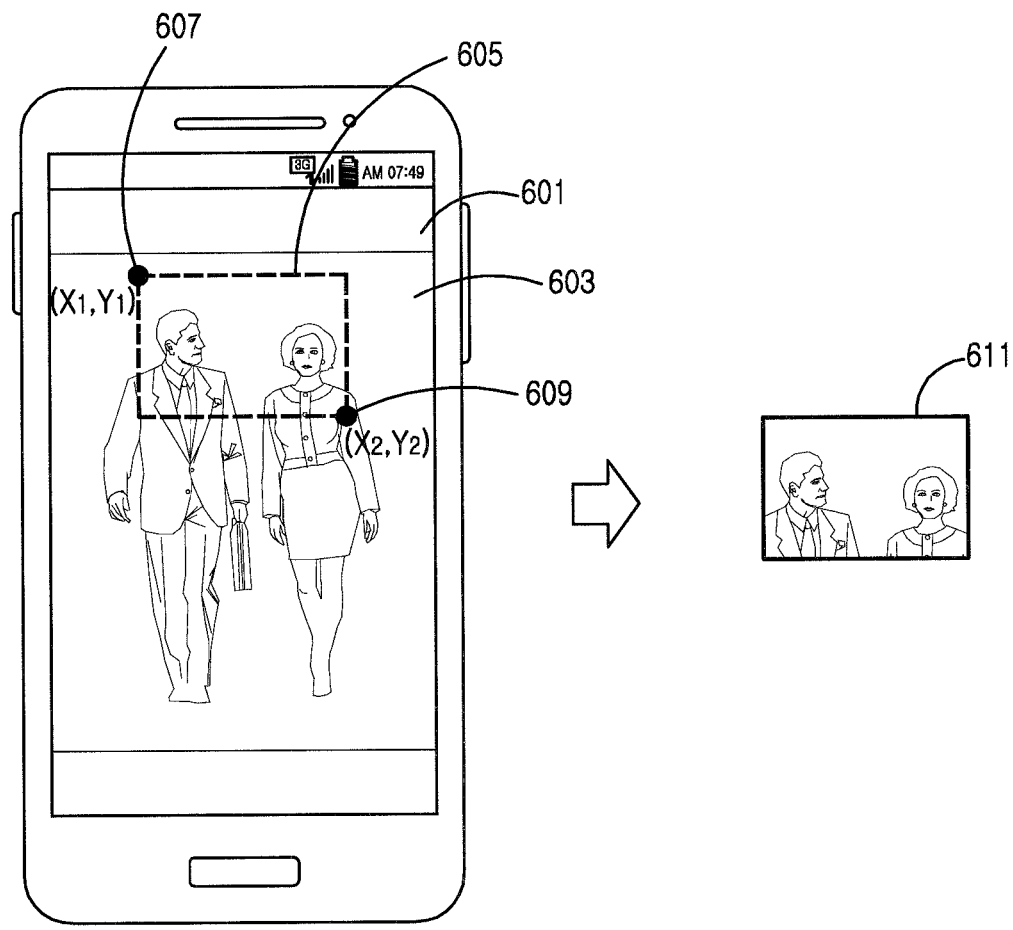
FIGS. 6A and 6B illustrate a screen configuration of generating some areas of person information as a thumbnail image according to coordinates of person information included in an image in an electronic device according to an embodiment of the present disclosure.

FIGS. 6A and 6B illustrate a screen configuration of generating some areas of person information as a thumbnail image according to coordinates of person information included in an image in an electronic device according to an embodiment of the present disclosure.

Referring to FIGS. 6A and 6B, if a face is recognized from an image displayed on a display unit 601 of the electronic device, the electronic device sets coordinates 607 and 609 of an area 605 including the face in an image 603. In this case, the electronic device generates a part of the area 605 including the face as a thumbnail image 611 according to the coordinates 607 and 609 of the area 605 including the face.

Referring back to FIG. 5, after generating the thumbnail image, the electronic device stores image data including thumbnail image data in operation 511. For example, after generating the thumbnail image, the electronic device stores thumbnail image data and coordinates 607 and 609 for the area 605 including the face in the image 603 by using at least one of EXIF, XMP, IPTC, and the like, as shown in FIG. 6A.

Subsequently, the electronic device terminates this algorithm.

In the above-described embodiment, the electronic device generates some areas of person information as a thumbnail image according to the coordinates of person information in an image. In another embodiment, the electronic device may also generate some areas of place information as a thumbnail image according to the coordinates of place information in an image.

Figure 7:
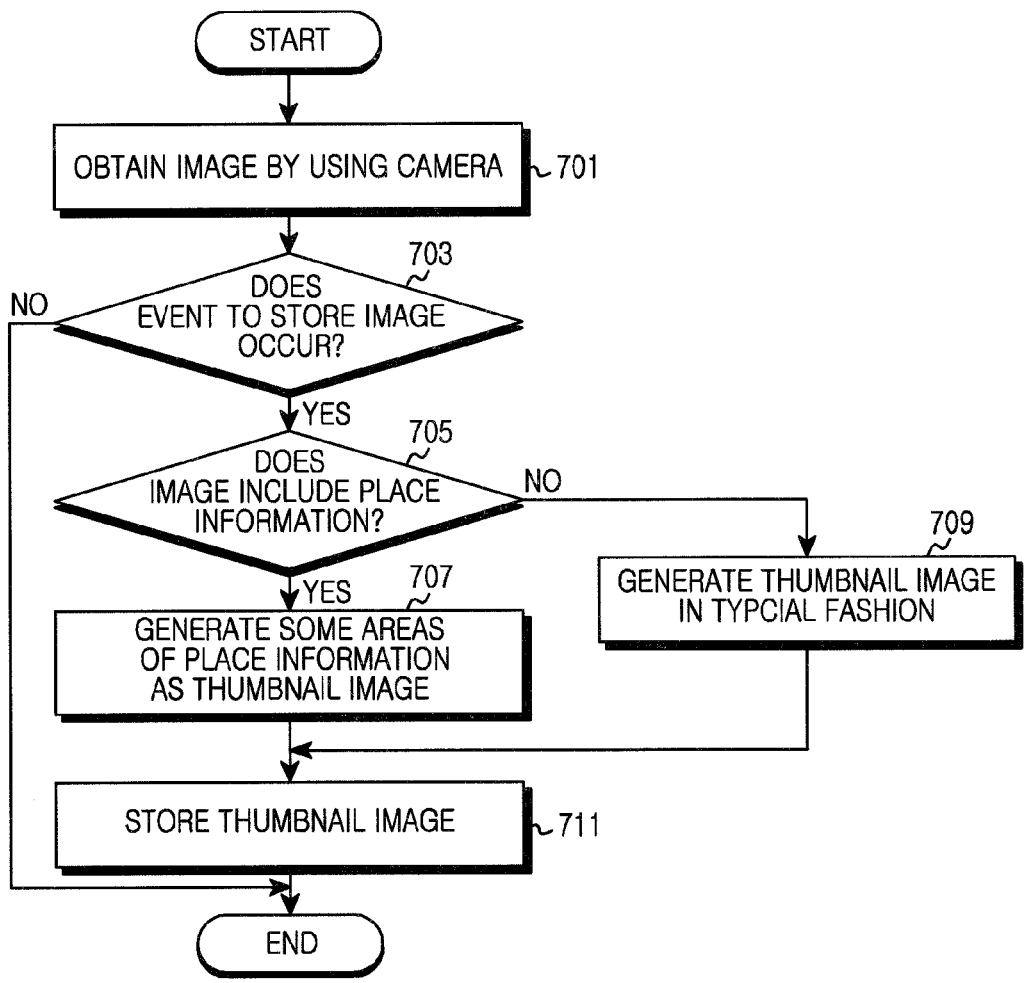
FIG. 7 is a flowchart of a procedure of generating some areas of place information as a thumbnail image according to coordinates of place information included in an image in an electronic device according to an embodiment of the present disclosure.

FIG. 7 is a flowchart of a procedure of generating some areas of place information as a thumbnail image according to coordinates of place information included in an image in an electronic device according to an embodiment of the present disclosure.

Referring to FIG. 7, the electronic device obtains an image by using the camera in operation 701. For example, if the front or rear camera of the electronic device is driven, the electronic device displays an image obtained through the camera as a preview on a display unit. In this case, the electronic device may display the image obtained through the camera as a preview through refresh operations. Here, the image displayed as the preview may be an image that is obtained through the camera of the electronic device and temporarily stored in a buffer memory.

After obtaining an image by using the camera, the electronic device determines whether an event to store an image occurs, in operation 703. For example, the electronic device determines by menu or button manipulation whether an event to store an image displayed as a preview occurs. As another example, the electronic device may also determine by a timer whether an event to store an image displayed as a preview occurs. If it is determined in operation 703 that the event to store the image does not occur, the electronic device terminates this algorithm. Moreover, if the event to store the image does not occur, the electronic device may also maintain the operation of displaying the image obtained through the camera as a preview.

On the other hand, if it is determined in operation 703 that the event to store the image occurs, the electronic device determines whether the image includes place information, in operation 705. For example, the electronic device may determine by using an angle of view of a camera, a bearing, location information, (2D and 3D) map information whether there is a detected place (i.e., a statue, a building, remains, and the like).

If it is determined in operation 705 that the image does not include place information, the electronic device generates a thumbnail image in a typical fashion in operation 709. For example, the electronic device reduces the size of an image to generate a thumbnail image. As another example, the electronic device may crop the image based on focus information represented on the image to generate a thumbnail image.

On the other hand, if it is determined in operation 705 that the image includes place information, the electronic device generates some areas of place information as a thumbnail image according to the coordinates of place information, in operation 707.

Figures 8A, 8B:
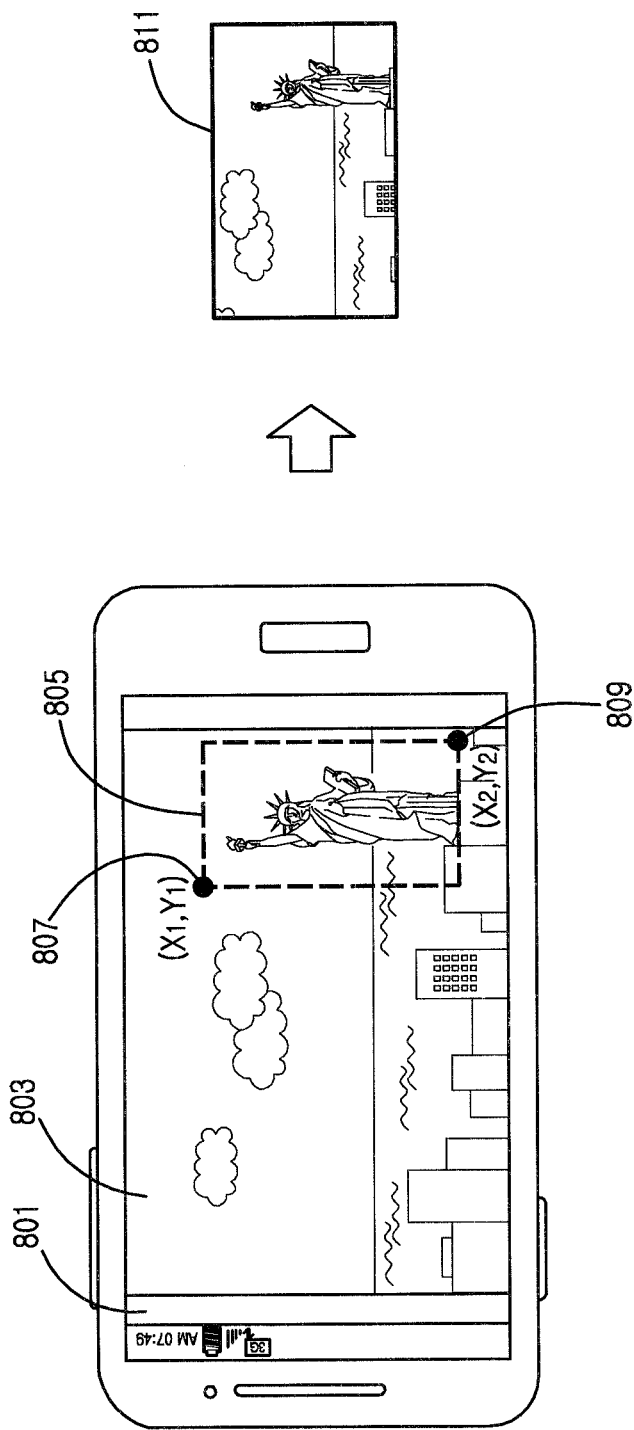
FIGS. 8A and 8B illustrate a screen configuration of generating some areas of place information as a thumbnail image according to coordinates of place information included in an image in an electronic device according to an embodiment of the present disclosure.

FIGS. 8A and 8B illustrate a screen configuration of generating some areas of place information as a thumbnail image according to coordinates of place information included in an image in an electronic device according to an embodiment of the present disclosure.

Referring to FIGS. 8A and 8B, if the image "The Statue of Liberty" is detected from an image 803 displayed on a display unit 801 of the electronic device, the electronic device sets coordinates 807 and 809 of an area 805 including the image "The Statue of Liberty" in the image 803. In this case, the electronic device generates a part of the area 805 including the image "The Statue of Liberty" as a thumbnail image 811 according to the coordinates of the area 805 including the image "The Statue of Liberty".

Referring back to FIG. 7, after generating the thumbnail image, the electronic device stores image data including thumbnail image data in operation 711. For example, after generating the thumbnail image, the electronic device stores thumbnail image data and coordinates 807 and 809 for the area 805 including the image "The Statue of Liberty" in the image 803 by using at least one of EXIF, XMP, IPTC, and the like.

Subsequently, the electronic device terminates this algorithm.

In the above-described embodiment, the electronic device generates some areas of place information as a thumbnail image according to the coordinates of place information in an image.

In another embodiment, the electronic device may also generate, as a thumbnail image, some areas of at least one piece of person information and at least one piece of place information in an image.

Figure 9B:
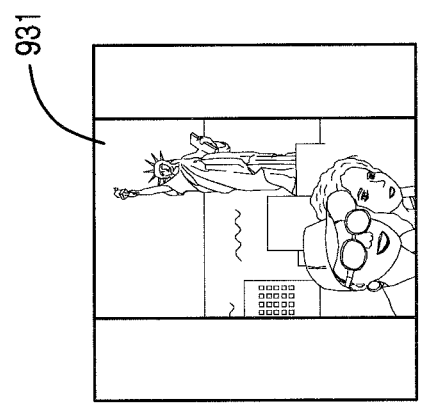
FIGS. 9A and 9B illustrate a screen configuration of generating some areas of person information and place information as a thumbnail image according to coordinates of person information and place information included in an image in an electronic device according to an embodiment of the present disclosure.
Figure 9A:
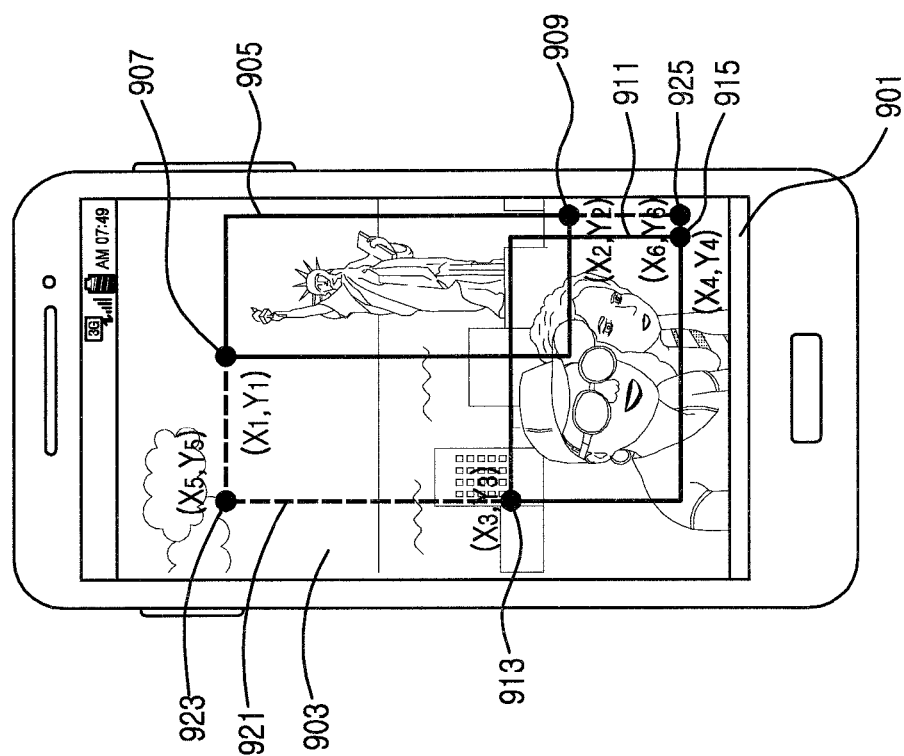

FIGS. 9A and 9B illustrate a screen configuration of generating some areas of person information and place information as a thumbnail image according to coordinates of person information and place information included in an image in an electronic device according to an embodiment of the present disclosure.

Referring to FIGS. 9A and 9B, if a face is recognized from an image 903 obtained through the camera of the electronic device and displayed on a display unit 901 of the electronic device, the electronic device sets coordinates 913 and 915 of an area 911 including the face in the image 903. Moreover, if the image "The Statue of Liberty" is detected from the image 903, the electronic device sets coordinates 907 and 909 of an area 905 including the image "The Statue of Liberty" in the image 903.

Subsequently, the electronic device sets a first set of coordinates 913 and a second set of coordinates 915 for an area 911 including a face, and a third set of coordinates and a fourth set of coordinates 909 for the area 905 the image "The Statue of Liberty", and a fifth set of coordinates 923 and a sixth set of coordinates 925 for a reference area 921 including all in the image 903. Subsequently, the electronic device may generate some areas of the reference area 921 as a thumbnail image 931 according to the coordinates 925 of the reference area 921. In this case, the electronic device stores the coordinates 925 of the reference area 921, thumbnail image data and image data by using at least one of an EXIF, XMP, IPTC, and the like.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for generating a thumbnail image in an electronic device, the method comprising:
  displaying an image obtained from a camera as a preview;
  in response to detecting an event for storing the displayed image, determining whether the displayed image comprises at least one object;
  when determining that the displayed image comprises an object, setting coordinates for an area that includes the object in the displayed image;
  when determining that the displayed image comprises a first object and a second object, setting coordinates for a first area that includes the first object and a second area that includes the second object in the displayed image, and setting coordinates for a reference area based on the set coordinates of the first area and the second area; and
  generating the thumbnail image for the displayed image based on the set coordinates corresponding to any one of the area or the reference area.

2. The method of claim 1, wherein the generating of the thumbnail image comprises:
  in response to determining that the displayed image comprises the first object or the second object, generating the thumbnail image for the displayed image based on the set coordinates corresponding to the first area that includes the first object or the second area that includes the second object; and
  in response to determining that the displayed image comprises the first object and the second object, generating the thumbnail image for the displayed image based on the set coordinates corresponding to the reference area that includes the first object and the second object.

3. The method of claim 1, wherein the determining whether the displayed image comprises at least one object comprises detecting at least one piece of person information in the displayed image.

4. The method of claim 3, wherein the detecting of the at least one piece of person information comprises setting coordinates for the first area of the displayed image that includes at least one of a face, upper body, or whole body of a person in the displayed image by using facial recognition.

5. The method of claim 1, wherein the determining whether the displayed image comprises at least one object comprises detecting at least one piece of place information in the displayed image.

6. The method of claim 5,
wherein the detecting of the at least one piece of place information comprises setting coordinates for the second area of the displayed image that includes place information by using an angle of the camera, a bearing, location information, and 2 dimensional and 3 dimensional (2D and 3D) map information, and
wherein the place information comprises at least one of a statue, a building, or remains.

7. The method of claim 1, wherein the generating of the thumbnail image comprises storing thumbnail image data in metadata of image data.

8. The method of claim 7, wherein the storing of the thumbnail image data comprises storing coordinates for the first area that includes the first object, the thumbnail image data, and the image data by using at least one of an exchangeable image file format (EXIF), an extensible metadata platform (XMP), or an international press telecommunications council (IPTC).

9. The method of claim 7, further comprising:
detecting coordinates of the first area that includes the first object in the metadata of the image data, when an event to display the thumbnail image for the image occurs.

10. The method of claim 9, further comprising:
displaying the first area that includes the first object as the thumbnail image of the displayed image according to the set coordinates.

11. An electronic device comprising:
a memory;
a camera;
a display; and
a processor configured to:
display an image obtained from the camera as a preview on the display,
in response to detecting an event for storing the displayed image, determine whether the displayed image comprises at least one object,
when determining that the displayed image comprises an object, set coordinates for an area that includes the object in the displayed image,
when determining that the displayed image comprises a first object and a second object, set coordinates for a first area that includes the first object and a second area that includes the second object in the displayed image, and set coordinates for a reference area based on the set coordinates of the first area and the second area, and
generate a thumbnail image for the displayed image based on the set coordinates corresponding to any one of the area or the reference area.

12. The electronic device of claim 11, wherein the processor is further configured to:
in response to determining that the displayed image comprises the first object or the second object, generate the thumbnail image for the displayed image based on the set coordinates corresponding to the first area that includes the first object or the second area that includes a second object, and
in response to determining that the displayed image comprises the first object and the second object, generate the thumbnail image for the displayed image based on the set coordinates corresponding to the reference area that includes the first object and the second object.

13. The electronic device of claim 11, wherein the processor is further configured to:
detect at least one piece of person information in the displayed image.

14. The electronic device of claim 13, wherein the processor is further configured to:
set coordinates for the first area of the displayed image that includes at least one of a face, upper body, or whole body of a person in the displayed image by using facial recognition, when the at least one piece of person information is detected.

15. The electronic device of claim 11, wherein the processor is further configured to:
detect at least one piece of place information in the displayed image.

16. The electronic device of claim 15,
wherein the processor is further configured to:
set coordinates for the second area of the displayed image that includes place information by using an angle of the camera, a bearing, location information, and 2 dimensional and 3 dimensional (2D and 3D) map information, when the at least one piece of place information is detected, and
wherein the place information comprises at least one of a statue, a building, or remains.

17. The electronic device of claim 11, wherein the processor is further configured to:
store thumbnail image data in metadata of image data.

18. The electronic device of claim 17, wherein the processor is further configured to:
store coordinates for the first area that includes the first object, the thumbnail image data, and the image data by using at least one of an exchangeable image file format (EXIF), an extensible metadata platform (XMP), or an international press telecommunications council (IPTC).

19. The electronic device of claim 17, wherein the processor is further configured to:
detect coordinates of the first area that includes the first object in the metadata of the image data, when an event to display the thumbnail image for the image occurs.

20. The electronic device of claim 19, wherein the processor is further configured to:
display the first area that includes the first object as the thumbnail image of the displayed image according to the set coordinates.

21. The method of claim 1, further comprising:
when the at least one object is not detected from the displayed image, generating the thumbnail image by reducing a size of the image or cropping the image based on focus information represented on the image.

22. The method of claim 1, further comprising:
- detecting a first type object and a second type object different from the first type object in the displayed image;
- setting first coordinates for the first type object and second coordinates for the second type object;
- determining a reference area including the first type object and the second type object based on the first coordinates and the second coordinates; and
- generating at least one area of the reference area including the first type object and the second type object as the thumbnail image.

23. The electronic device of claim 11, wherein the processor is further configured to:
- when the at least one object is not detected from the displayed image, generate the thumbnail image by reducing a size of the image or cropping the image based on focus information represented on the image.

24. The electronic device of claim 11, wherein the processor is further configured to:
- detect a first type object and a second type object different from the first type object in the displayed image;
- set first coordinates for the first type object and second coordinates for the second type object;
- determine a reference area including the first type object and the second type object based on the first coordinates and the second coordinates; and
- generate at least one area of the reference area including the first type object and the second type object as the thumbnail image.

* * * * *